United States Patent
Kim et al.

(10) Patent No.: US 11,449,672 B2
(45) Date of Patent: Sep. 20, 2022

(54) METHOD FOR OPERATING SPEECH RECOGNITION SERVICE AND ELECTRONIC DEVICE AND SERVER FOR SUPPORTING THE SAME

(71) Applicant: Samsung Electronics Co., Ltd., Suwon-si (KR)

(72) Inventors: Yong Wook Kim, Seoul (KR); Dong Kyu Lee, Yongin-si (KR); Ja Min Goo, Suwon-si (KR); Gang Heok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 16/038,893

(22) Filed: Jul. 18, 2018

(65) Prior Publication Data

US 2019/0027135 A1    Jan. 24, 2019

(30) Foreign Application Priority Data

Jul. 18, 2017    (KR) .................. 10-2017-0090891

(51) Int. Cl.
*G06F 17/00*   (2019.01)
*G06F 40/20*   (2020.01)
(Continued)

(52) U.S. Cl.
CPC .............. *G06F 40/20* (2020.01); *G06F 3/167* (2013.01); *G10L 15/1822* (2013.01);
(Continued)

(58) Field of Classification Search
CPC ......... G10L 15/22; G10L 15/30; G10L 15/26; G10L 2015/223; G10L 15/08;
(Continued)

(56) References Cited

U.S. PATENT DOCUMENTS 9,318,108 B2 *   4/2016   Gruber ................ G06F 16/3344
9,653,078 B2     5/2017   Watanabe
(Continued)

FOREIGN PATENT DOCUMENTS

EP   3010015 A1      4/2016
JP   2003-088686 A   3/2003
(Continued)

OTHER PUBLICATIONS

Notification of Transmittal of the International Search Report and The Written Opinion of the International Searching Authority, or the Declaration dated Oct. 25, 2018 in connection with International Patent Application No. PCT/KR2018/008114, 10 pages.
(Continued)

*Primary Examiner* — Paul C McCord

(57) ABSTRACT

Disclosed is an electronic device including a communication circuit, a microphone, a memory, speaker, and a processor, in which the processor receives the speech input and transmits first data associated with the speech input to a first server for supporting the speech recognition service, receives second data corresponding to processing of a part of the first data from the first server and outputs the second data at a first time that a first period of time has elapsed after the transmission of the first data, and outputs third data corresponding to processing of the rest of the first data at a second time that a second period of time has elapsed from the first time, while receiving the third data from the first server or a second server for supporting the speech recognition service before the second time.

16 Claims, 8 Drawing Sheets

(51) Int. Cl.
*H04R 27/00* (2006.01)
*G06F 3/16* (2006.01)
*G10L 15/18* (2013.01)
*G10L 15/22* (2006.01)
*H04R 1/08* (2006.01)

(52) U.S. Cl.
CPC ............... *G10L 15/22* (2013.01); *H04R 1/08* (2013.01); *H04R 27/00* (2013.01); *H04R 2227/003* (2013.01); *H04R 2420/07* (2013.01)

(58) Field of Classification Search
CPC ............ G10L 17/22; G10L 2015/225; G10L 15/1822; G10L 15/32; G10L 15/00; G10L 15/01; G10L 17/00; G10L 13/08; G10L 15/05; G10L 15/063; G10L 15/10; G10L 15/142; G10L 15/16; G10L 15/18; G10L 15/183; G10L 15/19; G10L 15/222; G10L 15/24; G10L 15/265; G10L 15/28; G10L 15/34; G06F 40/20; G06F 3/167; H04R 1/08; H04R 27/00; H04R 2227/003; H04R 2420/07
USPC ........ 704/251, 231, 235, 270, 275, E15.005, 704/E15.04, E15.043; 379/88.01; 709/231
See application file for complete search history.

(56) References Cited

U.S. PATENT DOCUMENTS

| | | | |
|---|---|---|---|
| 9,666,192 | B2 | 5/2017 | Fanty |
| 10,140,986 | B2* | 11/2018 | Froelich ................ G10L 15/02 |
| 10,546,587 | B2 | 1/2020 | Chakladar et al. |
| 2014/0316776 | A1* | 10/2014 | Lee .................... G10L 15/22 |
| | | | 704/231 |
| 2016/0026433 | A1 | 1/2016 | Smith et al. |
| 2016/0055849 | A1 | 2/2016 | Watanabe |
| 2016/0104484 | A1* | 4/2016 | Chakladar ............ G06F 40/289 |
| | | | 704/235 |
| 2016/0351196 | A1 | 12/2016 | Fanty |
| 2016/0360332 | A1 | 12/2016 | Shin et al. |
| 2017/0110117 | A1 | 4/2017 | Chakladar et al. |
| 2020/0175990 | A1 | 6/2020 | Fanty |

FOREIGN PATENT DOCUMENTS

| | | |
|---|---|---|
| JP | 2016-045655 A | 4/2016 |
| KR | 10-2001-0055929 A | 7/2001 |
| KR | 10-2016-0043836 A | 4/2016 |
| WO | 2016191352 A1 | 12/2016 |

OTHER PUBLICATIONS

Supplementary European Search Report in connection with European Application No. 18835186.0 dated Jun. 30, 2020, 6 pages.

* cited by examiner

METHOD FOR OPERATING SPEECH RECOGNITION SERVICE AND ELECTRONIC DEVICE AND SERVER FOR SUPPORTING THE SAME

CROSS-REFERENCE TO RELATED APPLICATION AND CLAIMS OF PRIORITY

This application is based on and claims priority under 35 U.S.C. § 119 to Korean Patent Application No. 10-2017-0090891, filed on Jul. 18, 2017, in the Korean Intellectual Property Office, the disclosure of which is incorporated by reference herein in its entirety.

BACKGROUND

1. Field

Various embodiments of the present disclosure described herein relate to a technology for reducing time spent waiting for a response to a speech input.

2. Description of Related Art

In an effort to interact with a user, a recent electronic device supports various input methods. For example, the electronic device may support a speech input method for receiving a speech input corresponding to a user utterance, based on execution of a specified application program. In addition, the electronic device may support a speech recognition service that recognizes the speech input, derives the intent of the user utterance, and provides a response corresponding to the intent of the user utterance.

The speech recognition service may be implemented based on an artificial intelligence (AI) system using a machine learning algorithm. The artificial intelligence system may be a computer system that implements human-level intelligence, in which the machine learns and determines by itself and a recognition rate is enhanced as it is frequently used. Artificial intelligence technology may be constituted by a machine learning (e.g., deep learning) technology using an algorithm that classifies/learns characteristics of input data by itself and element technologies for simulating functions of a human brain, such as recognition, determination, and the like, by using a machine learning algorithm (e.g., a linguistic understanding technology for recognizing human languages/characters, an inference/prediction technology for making a logical inference and prediction by determining information).

The above information is presented as background information only to assist with an understanding of the present disclosure. No determination has been made, and no assertion is made, as to whether any of the above might be applicable as prior art with regard to the present disclosure.

SUMMARY

A response of an electronic device to a speech input may be provided (or output) through a series of processes of analyzing information of a user utterance, based on a linguistic model or algorithm. Accordingly, the response of the electronic device may be provided after a predetermined period of time has elapsed from the user utterance, and the time period may be understood as time during which a user waits for the response of the electronic device. However, the response wait time may act as an obstacle to recognizing that the user utterance (or speech input) is being normally processed, and may deteriorate operating efficiency or reliability of the speech recognition service.

Embodiments according to the present disclosure address at least the above-mentioned problems and/or disadvantages and to provide at least the advantages described below. Accordingly, embodiments according to the present disclosure provide a speech recognition service operating method for reducing a user's response wait time by providing a part of a response corresponding to a user utterance early before the user utterance (or speech input) is completely processed, and to provide an electronic device and a server supporting the same.

In accordance with certain embodiments of the present disclosure, an electronic device for supporting a speech recognition service includes a communication circuit in communication with at least one external device, a microphone that receives a speech input corresponding to a user utterance, a memory that stores at least one piece of data associated with an operation of the speech recognition service, at least one speaker that outputs speech data, and a processor electrically connected to the communication circuit, the microphone, the memory, and the speaker.

According to various embodiments, the processor may receive the speech input and transmit first data associated with the speech input to a first server that supports the speech recognition service, may receive second data corresponding to processing of a part of the first data from the first server and output the second data at a first time that a first period of time has elapsed after the transmission of the first data, and may output third data corresponding to processing of the rest of the first data at a second time that a second period of time has elapsed from the first time, when receiving the third data from the first server or a second server for supporting the speech recognition service before the second time.

In accordance with certain embodiments according to the present disclosure, a method for operating a speech recognition service by an electronic device includes receiving a speech input corresponding to a user utterance and transmitting first data associated with the speech input to a first server that supports the speech recognition service, receiving second data corresponding to processing of a part of the first data from the first server and outputting the second data at a first time that a first period of time has elapsed after the transmission of the first data, and outputting third data corresponding to processing of the rest of the first data at a second time that a second period of time has elapsed from the first time, when receiving the third data from the first server or a second server for supporting the speech recognition service before the second time.

In accordance with certain embodiments according to the present disclosure, a server for supporting a speech recognition service includes a communication interface that supports communication with at least one external device, a memory that stores at least one piece of data associated with an operation of the speech recognition service, a speech input processing module that processes a speech input received from a first external device, and a processor electrically connected to the communication interface, the memory, and the speech input processing module.

According to certain embodiments, the memory of the server may store at least one instruction that, when executed, causes the processor to receive first data associated with the speech input from the first external device, based on the communication interface, to process the first data, based on at least one of communication with the speech input processing module and communication with at least one second external device, to transmit second data corresponding to processing of a part of the first data to the first external device at a first time that the processing of the part of the first data is completed, and to receive third data corresponding to processing of the rest of the first data from the at least one second external device and transmit the third data to the first external device at a second time after the transmission of the second data.

According to various embodiments, it is possible to reduce a time required until a response of an electronic device is provided after user utterance, thereby reducing a user's discomfort due to waiting for the response and enhancing operating efficiency or reliability of a speech recognition service.

In addition, embodiments according to the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
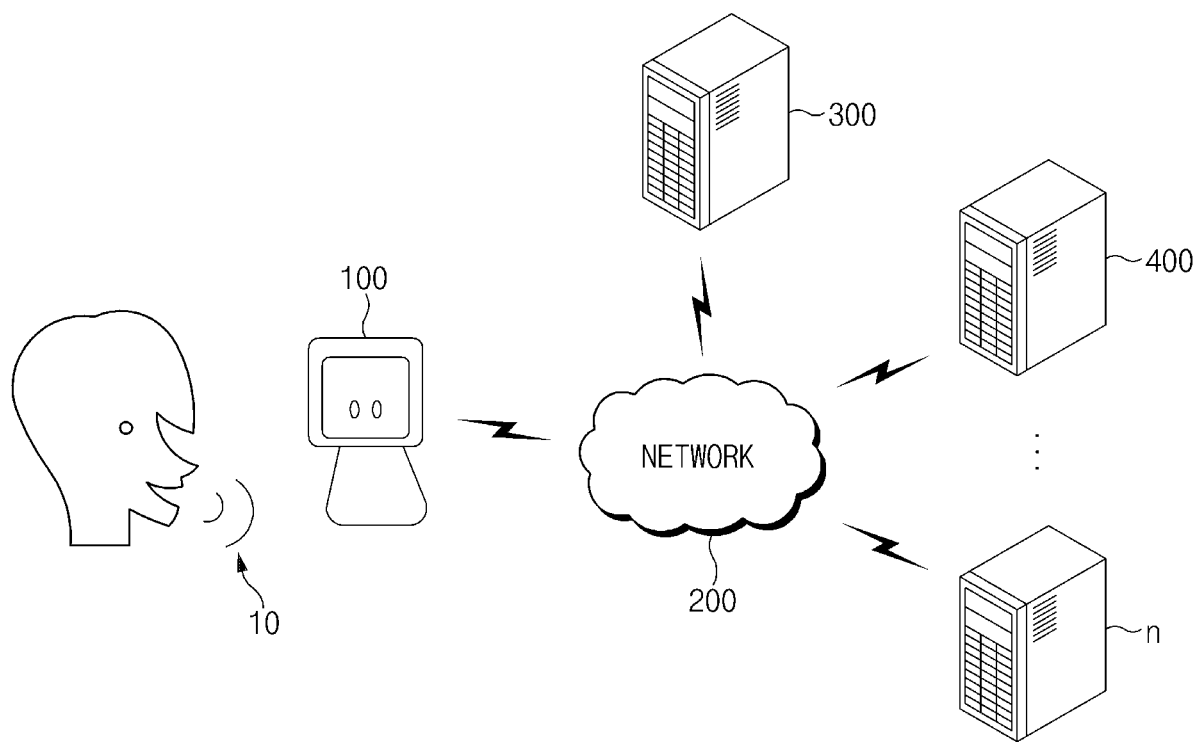
FIG. 1 illustrates an operating environment of an electronic device according to some embodiments.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) that performs corresponding operations by executing one or more software programs which are stored in a memory device.

Terms used in this disclosure are used to describe specific embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., SAMSUNG HOMESYNC™, APPLE TV™, or GOOGLE TV™), game consoles (e.g., XBOX™ or PLAYSTATION™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to certain embodiments may be a flexible electronic device. Furthermore, an electronic device according to some embodiments of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an operating environment of an electronic device according to various embodiments.

Referring to the non-limiting example of FIG. 1, an electronic device 100 may be associated with one or more servers 300 to n to construct an infrastructure for supporting a speech recognition service. For example, the electronic device 100 may establish a network 200 with the one or more servers 300 to n and may access the network 200 to transmit or receive at least one piece of data associated with an operation of the speech recognition service.

In an embodiment, the electronic device 100 may receive user utterance 10 involving a command or intent associated with acquisition of specific contents (or information). For example, in response to user control, the electronic device 100 may execute an application program (hereinafter, referred to as a speech recognition application) that supports an operation of the speech recognition service, and the electronic device 100 may receive a speech input corresponding to the user utterance 10 through an input device (e.g., a microphone) that is activated according to the execution of the speech recognition application. In regard to processing of the speech input, the electronic device 100 may transmit data associated with the speech input to the first server 300 (e.g., an intelligent server to be described below) that controls overall processing of the speech input, among the one or more servers 300 to n.

In certain embodiments, the first server 300 may derive the intent of the user utterance 10 by performing a logical inference, based on recognition or understanding of the speech input data received from the electronic device 100. The first server 300 may identify a first service server (e.g., 400) that operates or manages contents corresponding to the intent of the user utterance 10, among the one or more service servers 400 to n, based on the derived intent of the user utterance 10. The first server 300 may request the first service server 400 to transmit contents data to the electronic device 100, or may obtain the contents data from the first service server 400 and may transmit the obtained contents data to the electronic device 100. The electronic device 100 may respond to the user utterance 10 by outputting the contents data, that is received from the first server 300 or the first service server 400, in a text or speech form through an output device (e.g., a display, a speaker, or the like) mounted in the electronic device 100.

According to certain embodiments the electronic device 100 and the one or more servers 300 to n may perform a series of operations for providing a service based on speech recognition. For example, the electronic device 100 may receive the speech input corresponding to the user utterance 10 and may transmit the relevant data to the first server 300, and the first server 300 may derive the intent of the user utterance 10 by analyzing the speech input data. Furthermore, the first server 300 or the first service server 400 may transmit the contents data corresponding to the intent of the user utterance 10 to the electronic device 100 to support the response of the electronic device 100 to the user utterance 10 (e.g., the output of contents).

According to various embodiments, in the above-described processes, the electronic device 100 or the first server 300 may perform a specified functional operation to reduce time required until the response of the electronic device 100 is performed after the user utterance 10. For example, at a first time when the intent of the user utterance 10 is derived, the first server 300 may generate response data, based on information resources of the speech input data read to derive the intent of the user utterance 10 and may transmit the generated response data to the electronic device 100. Accordingly, the electronic device 100 may output the response data early as at least a part of the response corresponding to the user utterance 10 and may output the contents data received from the first server 300 or the first service server 400 at a second time after the output of the response data to complete the response. Hereinafter, various embodiments associated with reducing a response output time of the electronic device 100 (or a response wait time of a user) and functional operations of components for implementing the embodiments will be described.

Figure 2:
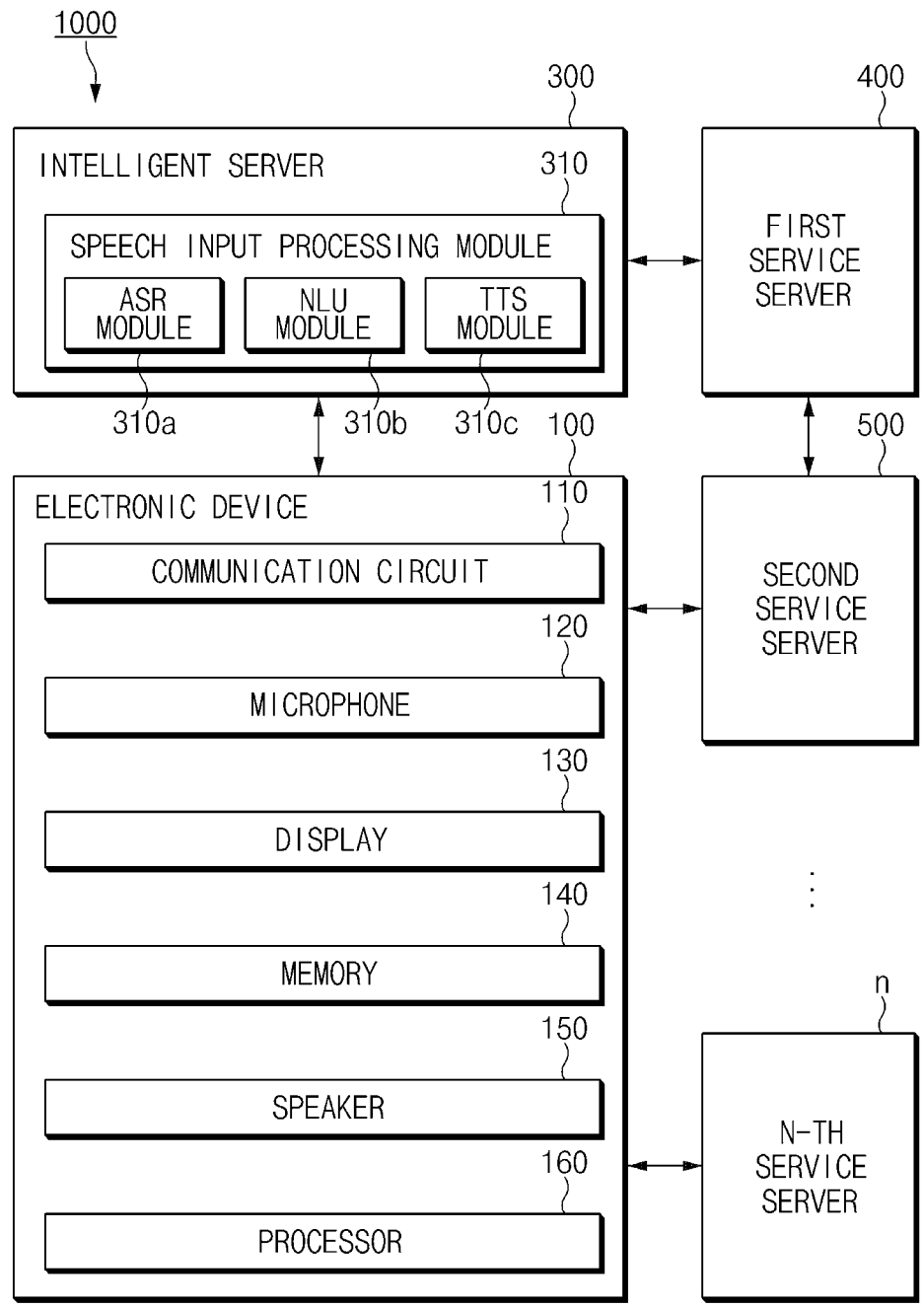
FIG. 2 illustrates an intelligent system according to various embodiments.

FIG. 2 illustrates an intelligent system according to some embodiments.

Referring to the non-limiting example of FIG. 2, an intelligent system 1000 may include the electronic device 100, the intelligent server 300, and the one or more service servers 400 to n. As mentioned above, the components of the intelligent system 1000 may be associated with one another based on the network 200 to interact together.

According to some embodiments, the electronic device 100 may include a communication circuit 110, a microphone 120, a display 130, a memory 140, a speaker 150, and a processor 160. In various embodiments, the electronic device 100 may not include at least one of the above-described components, or may further include other components. For example, the electronic device 100 may further include a housing (not illustrated) that implements at least a part of the exterior of the electronic device 100. The components of the electronic device 100 may be arranged inside or on the housing.

In various embodiments, at least a part of the electronic device 100 may move under the control of the processor 160. In this regard, the electronic device 100 may include an actuator (e.g., a motor) (not illustrated) disposed inside the housing to support the motion. Furthermore, the electronic device 100 may include a hardware key (not illustrated) disposed in an area thereof. When a user operation (e.g., a touch, a touch and hold, or the like) is applied to at least a partial area of the hardware key, the processor 160 may control execution of a speech recognition application in response to the user operation.

The communication circuit 110 may support communication between the electronic device 100 and an external device. For example, the communication circuit 110 may establish wired or wireless communication with the intelligent server 300 or the first to n-th service servers 400 to n according to a specified protocol. The communication circuit 110 may access the network 200, based on the wired or wireless communication and may exchange data with at least one of the intelligent server 300 and the first to n-th service servers 400 to n.

The microphone 120 may receive a speech signal (or a speech input) according to a user utterance. In various embodiments, the microphone 120 may be controlled to be triggered and driven by the execution of the speech recognition application or to remain in an always-on state (e.g., an always-on microphone). In various embodiments, in regard to reception efficiency of the speech signal, at least a part of the microphone 120 may be exposed to the outside through an area of the housing of the electronic device 100.

The display 130 may output various types of contents. For example, the display 130 may output personified contents (e.g., an icon, a symbol, an image, or the like), based on driving (or emitting light through) of at least some pixels. In various embodiments, the display 130 may modify at least a part of the personified contents by changing driving pixels in response to the control of the processor 160. Furthermore, the display 130 may output, in at least a partial area thereof, contents (e.g., text) transmitted from at least one of the intelligent server 300 and the first to n-th service servers 400 to n. This may be understood as at least a part of a response of the electronic device 100 to the user utterance. In various embodiments, the display 130 may include a touch screen display and may receive a touch input using a part (e.g., a finger) of a user's body or a stylus pen. When receiving the touch input, the display 130 may output a user interface associated with system setup of the electronic device 100, or may output a user interface including operating information of the electronic device 100.

The memory 140 may store at least one piece of data or information associated with an operation of a speech recognition service, or may store commands associated with functional operations of the components of the electronic device 100. Furthermore, the memory 140 may store at least one application program associated with an operation of the electronic device 100, in addition to the speech recognition application mentioned above. In various embodiments, the speech recognition application may be executed by utterance of a specified command (e.g., a wake-up command), in addition to the above-described user operation for the hardware key. In this regard, the electronic device 100 may include a command recognition module (not illustrated) for recognizing the utterance of the command.

The speaker 150 may be implemented with at least one speaker and may output a speech signal (or speech data). For example, the speaker 150 may output a speech signal generated in the electronic device 100 or received from at least one of the intelligent server 300 and the first to n-th service servers 400 to n. In certain embodiments, in regard to the output of a signal (or sound) from the electronic device 100 to the outside, at least a part of the speaker 150 may be exposed to the outside through an area of the housing of the electronic device 100.

The processor 160 may be electronically or operatively connected to at least one component of the electronic device 100 to perform control, communication operations, or data processing for the component. For example, the processor 160 may control the microphone 120 or the speaker 150 to receive or output a speech signal and may control the display 130 to output contents. Furthermore, the processor 160 may store, in the memory 140, data received from at least one of the intelligent server 300 and the first to n-th service servers 400 to n, or may load and process the data stored in the memory 140. In addition, processor 160 may perform various control or functional operations associated with an operation of a speech recognition service by the electronic device 100, and this will be described below with reference to the accompanying drawings.

According to some embodiments, the intelligent server 300 may include a speech input processing module 310 that processes speech input data received from the electronic device 100 to generate at least a part of a response of the electronic device 100 to a user utterance. Furthermore, in various embodiments, the intelligent server 300 may include a controller (or a processor) that controls functional operations of the speech input processing module 310, a storage device (or a memory) that stores data or commands associated with functional operations of the controller, or a communication interface (or a communication circuit) that supports access to the network 200.

According to various embodiments, the speech input processing module 310 may include an automatic speech recognition (ASR) module 310a, a natural language understanding (NLU) module 310b, or a text-to-speech (TTS) module 310c. In various embodiments, at least one module (e.g., the ASR module 310a, the NLU module 310b, or the TTS module 310c) included in the speech input processing module 310 may be separately implemented, or at least some of the modules may be integrated together. Furthermore, the various modules mentioned above may be implemented in hardware or software.

The ASR module 310a may recognize speech input data received from the electronic device 100 and may convert the speech input data into text data. For example, the ASR module 310a may convert the speech input data into the text data by using an acoustic model including at least one piece of information associated with utterance or vocalization or by using a language model including one or more pieces of unit phoneme information or a combination thereof. The ASR module 310a may transfer the converted text data to the NLU module 310b.

The NLU module 310b may derive the intent of the user utterance associated with the speech input data, based on the text data transferred from the ASR module 310a. In this regard, the NLU module 310b may derive the intent of the user utterance by dividing the text data into grammatical units (e.g., words, phrases, morphemes, or the like) and determining the meaning of the text data by analyzing grammatical elements or linguistic characteristics of the respective grammatical units. In some embodiments, the NLU module 310b may request the TTS module 310c to transmit feedback to the electronic device 100 in the case where the meaning of the text data is not clearly determined or the text data lacks information resources for deriving the intent of the user utterance.

In certain embodiments, in regard to the performance of a function of the TTS module 310c, the NLU module 310b may transfer at least some of the grammatical units (e.g., a grammatical unit corresponding to the subject, the object, or the predicate of the text data or a grammatical unit on the basis of which the intent of the user utterance is derived) to the TTS module 310c. Furthermore, the NLU module 310b may identify a server associated with the intent of the user utterance, among the one or more service servers 400 to n associated with the intelligent server 300, and may request contents (or information) corresponding to the intent of the user utterance from the corresponding service server. Alternatively, the NLU module 310b may request the identified service server to provide the contents (or information) to the electronic device 100. For example, the NLU module 310b may request contents data associated with weather information from a service server operating or managing the weather information in the case where the text data transferred from the ASR module 310a corresponds to the phrase "Let me know the weather today." and the intent of the user utterance is to request weather information.

In various embodiments, the NLU module 310b may construct an index or a database by mapping the text data and the derived intent of the user utterance. Thereafter, the NLU module 310b, when receiving text data from the ASR module 310a, may identify text data the same as, or similar to, the received text data with reference to the index or the database and may obtain the intent of the user utterance mapped onto the identified text data.

The TTS module 310c may convert text data into speech data. For example, the TTS module 310c may convert at least one grammatical unit transferred from the NLU module 310b (e.g., a grammatical unit corresponding to the subject, the object, or the predicate of the text data or a grammatical unit on the basis of which the intent of the user utterance is derived) into speech data and may transmit the speech data to the electronic device 100. Referring to the above-described example, the TTS module 310c may receive at least one grammatical unit of the text data (for example, "Let me know the weather today.") from the NLU module 310b and may vocalize the grammatical unit (or convert the grammatical unit into speech) to generate speech data (hereinafter, referred to as first speech data) such as "Today's weather is", "I'll let you know the weather today." or the like.

In various embodiments, the TTS module 310c may generate and store speech data (hereinafter, referred to as second speech data) in a separately specified form. In this regard, the TTS module 310c may generate and store the second speech data, such as "you inquired about" and may add the second speech data to the first speech data to generate speech data, such as "Today's weather you inquired about is". Alternatively, the TTS module 310c may generate and store the second speech data, such as "Please say again.", "Be specific, please.", or the like, and may transmit at least a part of the second speech data (e.g., "Please say again.", "Be specific, please.", or the like) to the electronic device 100 when the NLU module 310b requests the TTS module 310c to transmit the feedback.

In various embodiments, at least some components of the speech input processing module 310 may be included in the electronic device 100. For example, at least one of the ASR module 310a and the NLU module 310b may be included in the electronic device 100 to process a part of speech input data according to a user utterance and to transmit the processing result information to the intelligent server 300. Alternatively, the speech input processing module 310 may be included in the electronic device 100 to perform overall processing of the speech input data. In this case, the electronic device 100 may generate and output a part of a response to the user utterance and may request contents (or information) corresponding to the rest of the response from a specific service server associated with the derived intent of the user utterance.

The one or more service servers 400 to n may include servers of various third-party companies or institutions based on subscription or partnership for a speech recognition service. The one or more service servers 400 to n may operate or manage contents (or information) falling into different categories and may provide corresponding contents or information in at least one form of text data and speech data in response to a request of the intelligent server 300.

In various embodiments, the intelligent server 300 and the one or more service servers 400 to n may be implemented with a single integrated server. In this case, the integrated server may analyze speech input data received from the electronic device 100 and may provide data (e.g., speech data, contents data, or the like) corresponding to the speech input data.

Figure 3A:
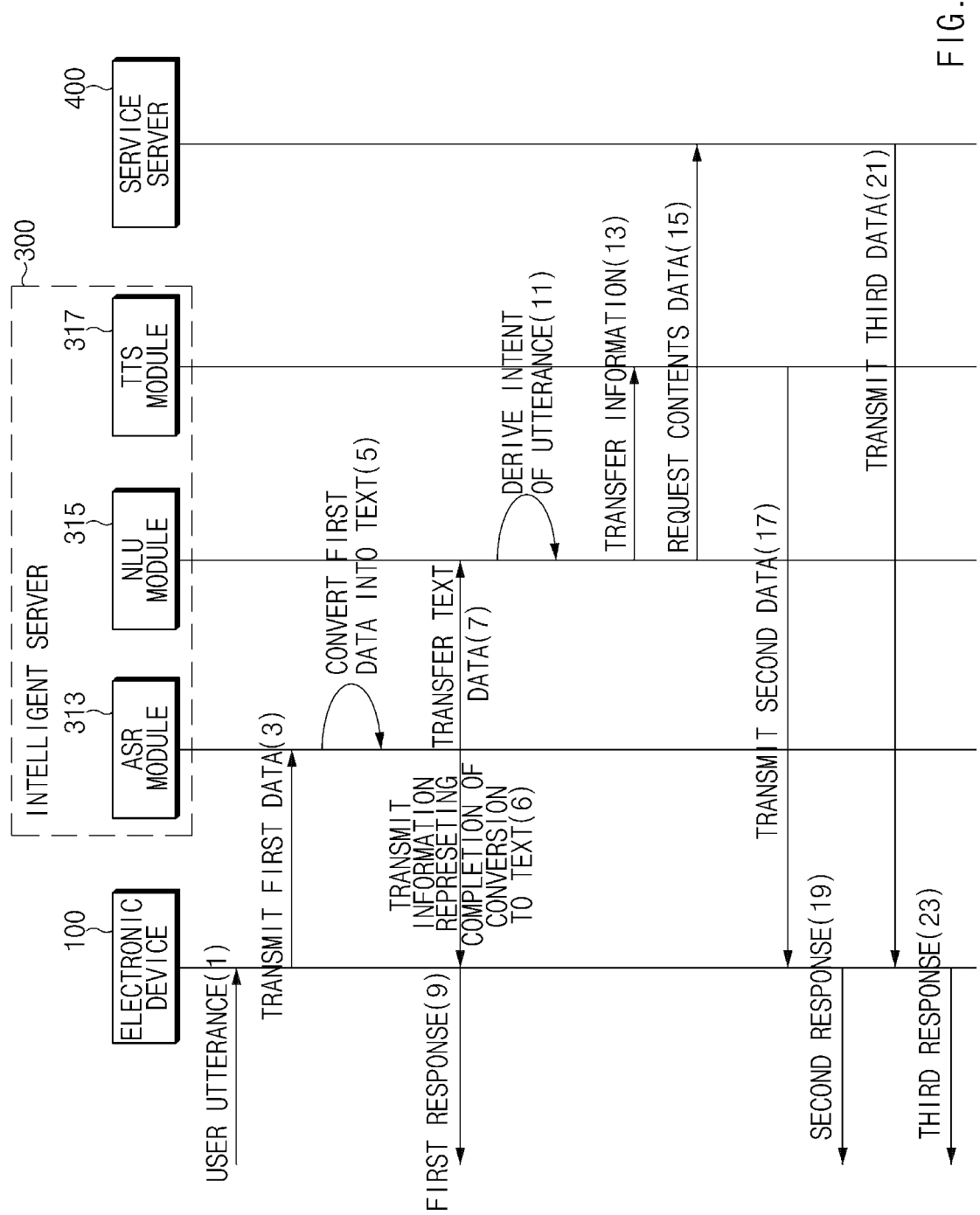
FIG. 3A illustrates operations for processing a user utterance according to certain embodiments.
Figure 3B:
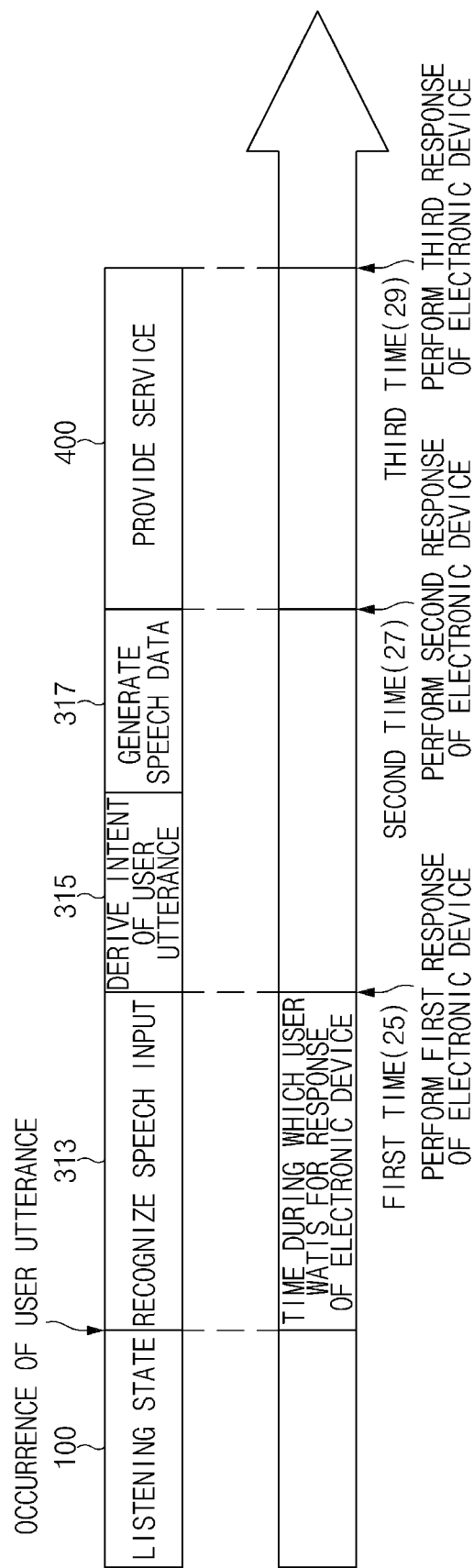
FIG. 3B illustrates aspects of processing a user utterance according to some embodiments.

FIG. 3A illustrates a series of operations for processing a user utterance according to various embodiments, and FIG. 3B provides a time line illustrating aspects of processing the user utterance according to some embodiments.

Referring to the non-limiting example of FIG. 3A, in operation 1, the electronic device 100 may receive a speech input corresponding to a user utterance through the microphone 120 mounted therein. The user utterance may involve, for example, a user's command or intent for obtaining specific contents (or information).

In operation 3, the processor 160 of the electronic device 100 may transmit first data associated with the speech input to the ASR module 313 of the intelligent server 300. In this operation, the processor 160 may pre-process the speech input to support highly reliable recognition of the ASR module 313 for the speech input. For example, the processor 160 may pre-process the speech input by performing at least one of the following methods on the speech input: adaptive echo cancellation for cancelling an echo; noise suppression for suppressing background noise; end-point detection for detecting an end point of user speech; automatic gain control for adjusting volume by applying a gain value; and equalizing for modifying frequency characteristics of a signal.

In operation 5, the ASR module 313 may convert the first data received from the electronic device 100 into text data by using at least one model associated with speech recognition. Thereafter, in operation 6, the ASR module 313 may transmit, to the electronic device 100, information (e.g., a message) representing that the conversion of the first data into the text data is completed, and in operation 7, the ASR module 313 may transfer the converted text data to the NLU module 315. In various embodiments, operations 6 and 7 may be performed at the same time or at a predetermined interval.

In operation 9, the processor 160 may control a first response of the electronic device 100 to the user utterance, in response to the information received from the ASR module 313, which the information represents that the conversion of the first data is completed. In some embodiments, the first response may include output of a specified sound (e.g., onomatopoeia or a sound effect, such as "well . . . " or "aha!") or a motion of the electronic device 100. The processor 160 may allow the user to recognize that the user utterance (or the speech input corresponding to the user utterance) is being normally processed, by starting to control the first response at a first time of receiving the information representing that the conversion of the first data is completed.

In operation 11, the NLU module 315 may derive the intent of the user utterance by analyzing the text data received from the ASR module 313. For example, the NLU module 315 may derive the intent of the user utterance that corresponds to the text data, by dividing the text data into one or more grammatical units (e.g., words, phrases, morphemes, or the like) and determining the meaning of the text data, based on grammatical elements or linguistic characteristics of the respective grammatical units.

In operations 13 and 15, the NLU module 315 may interact with the TTS module 317 or the service server 400, based on the derived intent of the user utterance. For example, the NLU module 315 may transfer, to the TTS module 317, information about at least some of the grammatical units, on the basis of which the intent of the user utterance is derived. Furthermore, the NLU module 315 may request contents (or information) corresponding to the intent of the user utterance from a service server (e.g., 400) associated with the intent of the user utterance, among the one or more service servers 400 to n that support an operation of a speech recognition service.

In operation 17, the TTS module 317 may convert the grammatical units received from the NLU module 315 from a text form to a speech form to generate second data and may transmit the second data to the electronic device 100. In various embodiments, the TTS module 317 may selectively convert the grammatical units transferred from the NLU module 315. For example, when receiving all grammatical units of the text data "Let me know the weather today." from the NLU module 315, the TTS module 317 may convert all of the grammatical units into speech to generate the second data, such as "I'll let you know the weather today.", or the TTS module 317 may selectively convert only some of the grammatical units into speech to generate the second data, such as "Today's weather is", "I'll let you know the weather", or "I'll let you know". Alternatively, when receiving only some of the grammatical units from the NLU module 315, the TTS module 317 may convert all or a part of the received grammatical units into speech to generate the second data, such as "Today's weather is", "I'll let you know the weather", "Today is", "The weather is", or "I'll let you know". The selective conversion of the grammatical units into speech by the TTS module 317 may be associated with determining the form of a second response, which will be described below.

In operation 19, the processor 160 may control the second response of the electronic device 100 to the user utterance, by outputting the second data received from the TTS module 317. The second response of the electronic device 100 (or the receipt of the second data) may be understood as being performed at a second time when a first period of time (e.g., a period of time including the performance of the first response) has elapsed after the transmission of the first data in operation 3.

According to certain embodiments, the second response may function differently from the above-described first response. For example, the first response may be a sound (e.g., onomatopoeia or a sound effect, such as "well . . . " or "aha!") or a motion (e.g., a movement of the electronic device 100) that is irrelevant to the user utterance, and may function as a notification of the normal processing of the user utterance. In contrast, the second response may function as a part of a response of the electronic device 100 that is relevant to the user utterance. In some embodiments, the processor 160 may control the electronic device 100 to remain in a standby state after performing the second response. The term "standby state" used herein may be understood as a state in which the electronic device 100 stands ready for receiving data from the intelligent server 300 or the service server 400 or a state in which the electronic device 100 is capable of performing another response depending on the receipt of data.

In operation 21, the service server 400 may transmit third data corresponding to the contents (or information) requested by the NLU module 315 to the electronic device 100, and in operation 23, the processor 160 may control a third response of the electronic device 100 to the user utterance by outputting the third data. Alternatively, in various embodiments, the service server 400 may transmit the third data to the NLU module 315, and the processor 160 may control the third response of the electronic device 100 by receiving the third data from the NLU module 315 and outputting the third data.

The third response of the electronic device 100 (or the receipt of the third data) may be understood as being performed at a third time when a second period of time has elapsed from the second time, and the second period of time may be understood as time spent by the electronic device 100 to perform the second response. In various embodiments, the third response may include information (or contents) corresponding to the command or intent involved in the user utterance and may be associated with the second response to constitute a complete response to the user utterance.

In certain embodiments, the processor 160 of the electronic device 100 may generate and store specified fourth data (e.g., speech data) and may operate the fourth data depending on the time when the third data is received from the service server 400 or the NLU module 315. For example, the processor 160 may control a fourth response of the electronic device 100 (e.g., "Requested information has not been updated yet.") by outputting the fourth data in the case where the third data is not transmitted from the service server 400 or the NLU module 315 within the second period of time spent by the electronic device 100 to perform the second response.

To sum up, the electronic device 100 may output at least one response in a specified form early before overall processing of the user utterance is completed, thereby reducing the user's substantial response wait time in relation to the provision of a response corresponding to the user utterance. Referring to the non-limiting example of FIG. 3B, in a listening state in which the electronic device 100 is capable of receiving a speech input by activating the microphone 120, the electronic device 100 may receive a speech input corresponding to a user utterance (e.g., "Let me know the weather today.") and may transmit the speech input data to the ASR module 313 of the intelligent server 300. The ASR module 313 may recognize and convert the received speech input data into text data and may transmit, to the electronic device 100, information representing that the conversion of the speech input data into the text data is completed. Accordingly, the electronic device 100 may allow the user to recognize that the user utterance (or the speech input corresponding to the user utterance) is being normally processed, by performing or outputting a first response including a specified sound (e.g., onomatopoeia or a sound effect, such as "well . . . " or "aha!") or a motion of the electronic device 100 at a first time 25 of receiving the information representing that the conversion of the speech input data is completed. According to some embodiments, the time interval between the occurrence of the user utterance and the first time 25 may be understood as a standby time during which the user waits for a response of the electronic device 100 to the user utterance. The NLU module 315 of the intelligent server 300 may receive the converted text data from the ASR module 313, may derive the intent of the user utterance, and may transfer, to the TTS module 317, at least some grammatical units of the text data, on the basis of which the intent of the user utterance is derived. The TTS module 317 may convert the transferred grammatical units from a text form to a speech form to generate speech data and may transmit the speech data to the electronic device 100. Accordingly, the electronic device 100 may perform or output a second response (e.g., "I'll let you know the weather today.", "Today's weather is", "I'll let you know the weather", "I'll let you know", "Today is", "The weather is", or the like) that functions as a part of a response corresponding to the user utterance, by outputting the received speech data at a second time 27 of receiving the speech data from the TTS module 317.

Figure 4:
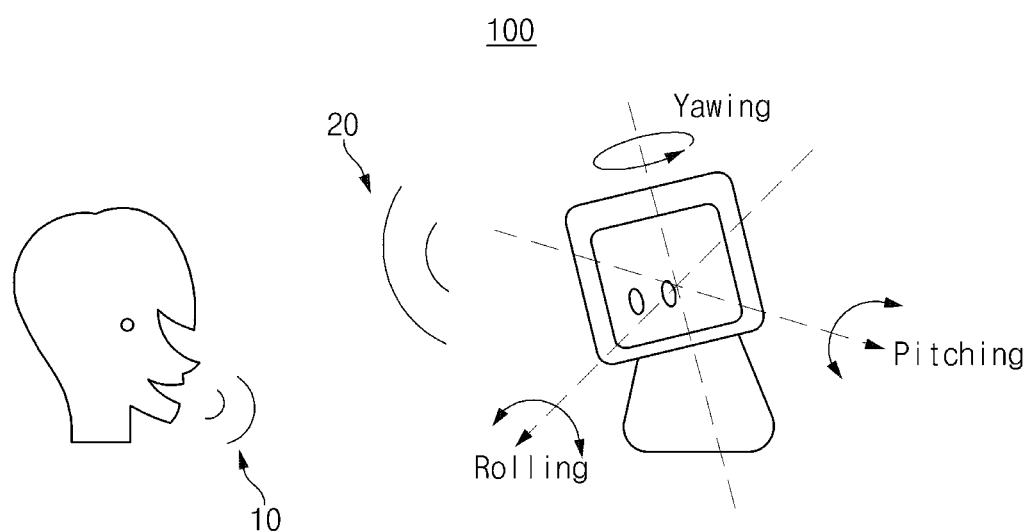
FIG. 4 illustrates a first response of an electronic device according to various embodiments.

A specific service server (e.g., at least one service server that operates or manages contents or information corresponding to the intent of the user utterance, for example, service server 400 in FIG. 4) may receive, from the NLU module 315, a request to transmit the contents or information data corresponding to the intent of the user utterance, and may transmit the corresponding data to the electronic device 100. Accordingly, the electronic device 100 may perform or output a third response (e.g., "It looks like a very hot day with temperatures more than 30 degrees Celsius.") that is a substantial response to the user utterance, by outputting the received data at a third time 29 of receiving the contents or information data.

According to the above description, the electronic device 100 may allow the user to recognize that a response to the user utterance is relatively rapidly provided, by performing or outputting the first response and the second response before the third time 29 that the substantial response corresponding to the user utterance is provided after the completion of overall processing of the user utterance.

In certain embodiments, an electronic device (e.g., the electronic device 100) includes a communication circuit , a microphone , a memory, at least one speaker configured to output speech data and a processor electrically connected to the communication circuit, the microphone, the memory, and the at least one speaker, wherein the processor is configured to obtain, using the microphone, a speech input corresponding to a user utterance, transmit, using the communication circuit, first data associated with the speech input to a first server configured to support the speech recognition service, output second data received from the first server after a first period of time has elapsed since the transmission of the first data, the second data being a part of a response of the user utterance, and output third data received from the first server or a second server configured to support the speech recognition service after a second period of time has elapsed from the first period of time , the third data being other part of the response of the user utterance. In certain embodiments, the processor may obtain, using the microphone, a speech input corresponding to a user utterance, wherein the user utterance includes at least one of keyword, transmit, using the communication circuit, first data associated with the speech input to a first server configured to support the speech recognition service, output second data received from the first server after a first period of time has elapsed since the transmission of the first data, the second data being a part of a response of the user utterance and including the at least one of keyword, and output third data received from the first server or a second server configured to support the speech recognition service after a second period of time has elapsed from the first period of time, the third data being other part of the response of the user utterance.

Figure 5:
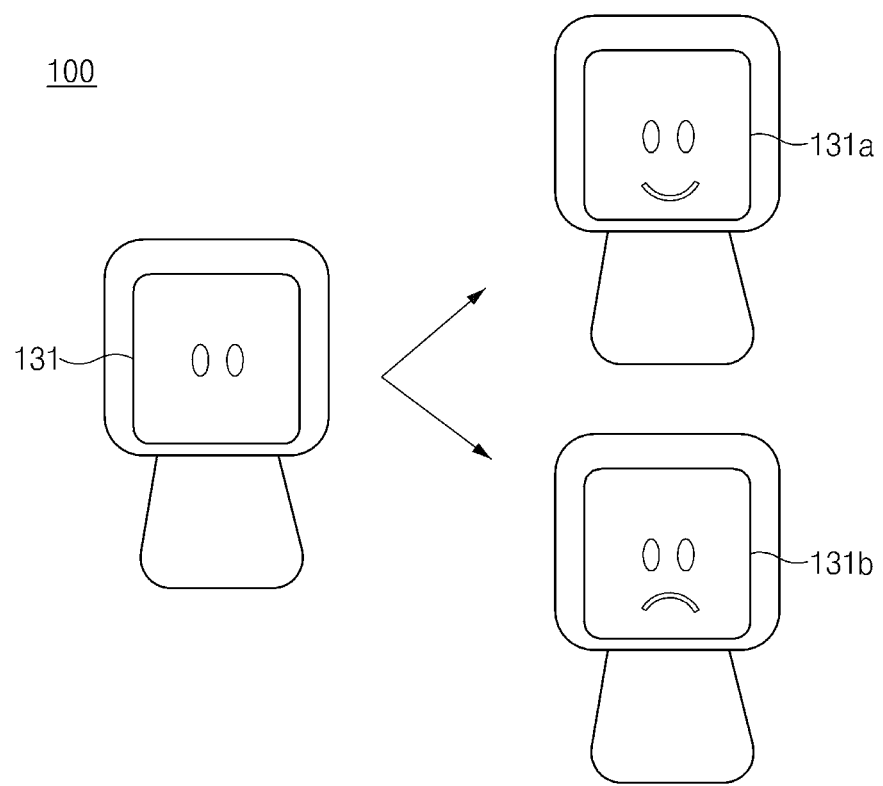
FIG. 5 illustrates personified content output by an electronic device according to certain embodiments.

FIG. 4 illustrates a first response of the electronic device according to various embodiments, and FIG. 5 illustrates personified contents output by the electronic device according to certain embodiments.

Referring to the non-limiting example of FIG. 4, the electronic device 100 may perform a first response including a specified sound or motion, in response to the user utterance 10. In this regard, the processor 160 of the electronic device 100 may control an actuator (e.g., a motor) mounted in the electronic device 100 at a first time of receiving completion information according to the performance of a function of the ASR module 313 (e.g., converting speech input data into text data) from the ASR module 313 of the intelligent server 300. In the case where the actuator is controlled by the processor 160, the electronic device 100 may perform the first response, such as moving upwards and downwards (e.g., yawing), moving forwards and backwards (e.g., pitching), or moving leftwards and rightwards (e.g., rolling) with respect to a specified axis. Alternatively, the processor 160 may control the speaker 150 of the electronic device 100 at the first time, and the electronic device 100 may perform the first response, such as outputting a specified sound 20 (e.g., onomatopoeia or a sound effect, such as "well . . . " or "aha!"). In various embodiments, in regard to the performance of the first response by the electronic device 100, the processor 160 may control the actuator and the speaker 150 in combination or alternately.

Referring to the non-limiting example of FIG. 5, the processor 160 may control the display 130 to output first contents 131 in a personified form at the time when the electronic device 100 starts to operate (or a speech recognition application is executed). In some embodiments, at least a part of the first contents 131 may be modified according to the performance of a response of the electronic device 100. For example, in the case where a response of the electronic device 100 to the user utterance is performed as the above-described third response (or the third data is received within the second period of time), the processor 160 may control driving (or light-emitting) of some pixels of the display 130 to change or covert the first contents 131 into second contents 131a (e.g., affirmative contents with a smile form). Alternatively, in the case where a response of the electronic device 100 is performed as the above-described fourth response (or the third data is not received within the second period of time), the processor 160 may change or convert the first contents 131 into third contents 131b (e.g., negative contents with the form of a tearful or frowning face). In various embodiments, the processor 160 may provide a specified effect (e.g., flickering) for the second contents 131a or the third contents 131b changed or converted from the first contents 131.

Figure 6:
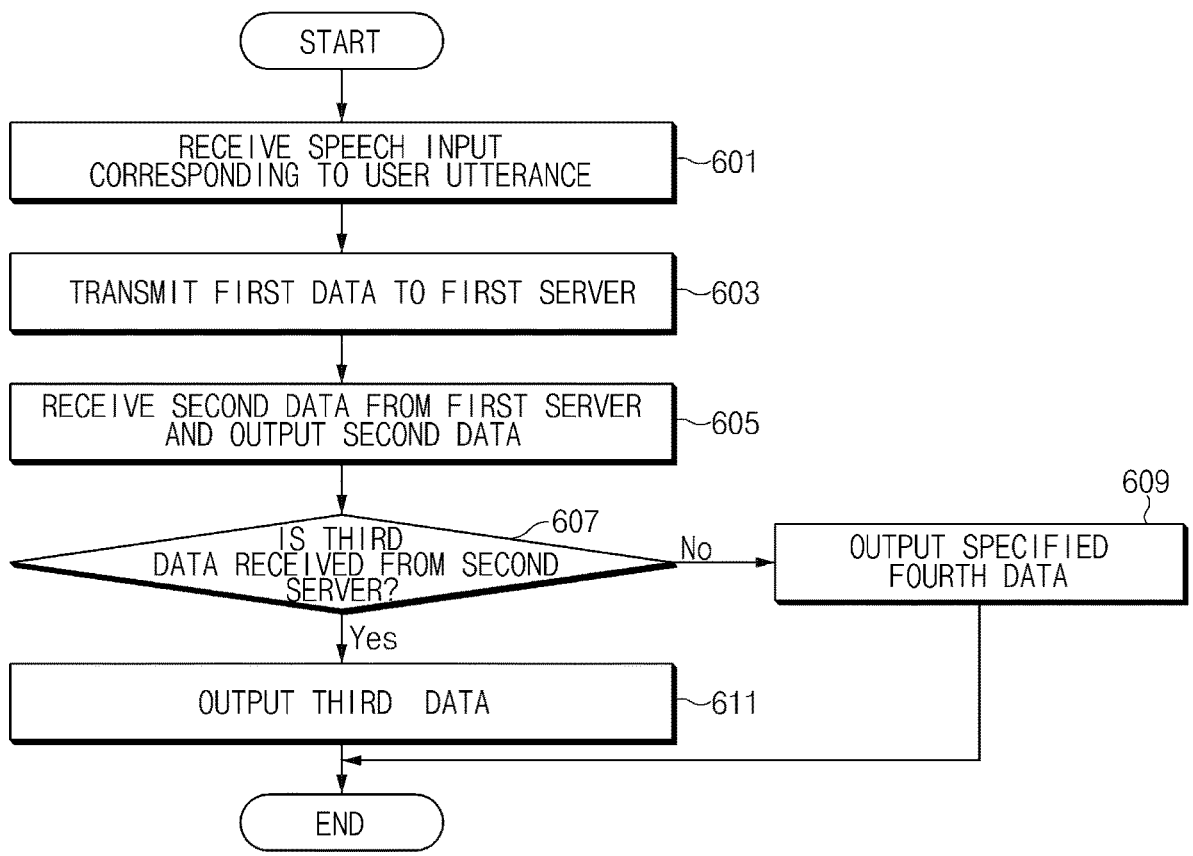
FIG. 6 illustrates operations of a method for operating a speech recognition service by an electronic device according to some embodiments.

FIG. 6 illustrates operations of a method of a speech recognition service by the electronic device according to various embodiments. The method of FIG. 6 may include at least some of the operations of FIGS. 3A and 3B, and repetitive descriptions thereof may be excluded.

Referring to the non-limiting example of FIG. 6, in operation 601, the processor 160 of the electronic device 100 may receive a speech input corresponding to a user utterance (e.g., "Let me know the weather today.") that involves a command or intent associated with acquisition of specific contents (or information). In this regard, the receipt of the speech input by the processor 160 may be subject to an operation of a hardware key disposed in an area of the electronic device 100 or execution of a speech recognition application based on utterance of a specified command.

In operation 603, the processor 160 may transmit first data associated with the speech input to a first server (e.g., the intelligent server 300 of FIG. 2) that controls overall processing of the speech input. In this operation, the processor 160 may pre-process the speech input (or the first data) to support the recognition of the first data by the first server.

In certain embodiments, the first server may perform a series of processes in connection with processing of the first data received from the electronic device 100. For example, the first server may recognize the first data to convert the first data into text data and may analyze the text data to derive the intent of the user utterance. Furthermore, the first server may generate second data by converting at least one grammatical unit (e.g., a word, a phrase, a morpheme, or the like) of the text data, on the basis of which the intent of the user utterance is derived, into a speech form. In addition, the first server may identify a specific server operating or managing third data (e.g., contents data or information data) corresponding to the intent of the user utterance, among one or more second servers (e.g., the service servers 400 to n of FIG. 2) that support an operation of a speech recognition service, and may request the specific server to transmit the third data to the electronic device 100.

In operation 605, the processor 160 may receive the second data from the first server and may output the second data at the time when a predetermined period of time has elapsed after the transmission of the first data to the first server. In some embodiments, the output of the second data may correspond to a part (e.g., "I'll let you know the weather today.", "Today's weather is", "I'll let you know the weather", "I'll let you know", "Today is", "The weather is", or the like) of a response of the electronic device 100 to the user utterance, and the second data may be output earlier than the third data corresponding to the intent of the user utterance to reduce time during which the user waits for the response of the electronic device 100.

In operation 607, the processor 160 may determine whether the third data is received from the second server. For example, the processor 160 may determine whether the third data is received within a specified time range from the time that the second data is received (e.g., time spent outputting the second data).

In operation 609, the processor 160 may output fourth data (e.g., speech data) stored in the electronic device 100 (or the memory 140) in the case where the third data is not transmitted from the second server within the specified time range. In various embodiments, the electronic device 100 may provide specified speech (e.g., "Requested information has not been updated yet.") to the user in response to the output of the fourth data. Alternatively, in the case where the third data is received within the specified time range, the processor 160 may, in operation 611, output the third data to control a response (e.g., "It looks like a very hot day with temperatures more than 30 degrees Celsius.") other than the partial response (e.g., the output of the second data) of the electronic device 100.

According to various embodiments, an electronic device for supporting a speech recognition service may include a communication circuit in communication with at least one external device, a microphone that receives a speech input corresponding to a user utterance, a memory that stores at least one piece of data associated with an operation of the speech recognition service, at least one speaker that outputs speech data, and a processor electrically connected to the communication circuit, the microphone, the memory, and the speaker.

According to various embodiments, the processor may receive the speech input and transmit first data associated with the speech input to a first server that supports the speech recognition service, may receive second data corresponding to processing of a part of the first data from the first server and output the second data at a first time that a first period of time has elapsed after the transmission of the first data, and may output third data corresponding to processing of the rest of the first data at a second time that a second period of time has elapsed from the first time, when receiving the third data from the first server or a second server for supporting the speech recognition service before the second time.

According to various embodiments, the processor may construct at least one piece of specified response data in the memory as a database in relation to processing of the speech input.

According to various embodiments, the processor may output fourth data corresponding to any one of the at least one piece of response data at the second time, when not receiving the third data from the first server or the second server before the second time that the second period of time has elapsed from the first time.

According to various embodiments, the electronic device may further include a display.

According to various embodiments, the processor may control the display to output first contents in a first form when outputting the third data at the second time and may control the display to output second contents in a second form at least partly different from the first form when outputting the fourth data at the second time.

According to various embodiments, the processor may output a specified sound, based on completion of recognition of the first data by the first server, or may control a motion of at least a partial area of the electronic device, at a third time before the first time.

According to various embodiments, the processor may control the electronic device to remain in a standby state at the first time, the electronic device being capable of receiving at least one piece of data from the external device in the standby state.

According to various embodiments, a method for operating a speech recognition service by an electronic device may include receiving a speech input corresponding to a user utterance and transmitting first data associated with the speech input to a first server that supports the speech recognition service, receiving second data corresponding to processing of a part of the first data from the first server and outputting the second data at a first time that a first period of time has elapsed after the transmission of the first data, and outputting third data corresponding to processing of the rest of the first data at a second time that a second period of time has elapsed from the first time, when receiving the third data from the first server or a second server for supporting the speech recognition service before the second time.

According to various embodiments, the method may further include constructing at least one piece of response data associated with processing of the speech input as a database.

According to various embodiments, the method may further include outputting fourth data corresponding to any one of the at least one piece of response data at the second time, when not receiving the third data from the first server or the second server before the second time that the second period of time has elapsed from the first time.

According to various embodiments, the method may further include outputting first contents in a first form when outputting the third data at the second time, and outputting second contents in a second form at least partly different from the first form when outputting the fourth data at the second time.

According to various embodiments, the method may further include outputting a specified sound, based on completion of recognition of the first data by the first server, or controlling a motion of at least a partial area of the electronic device, at a third time before the first time.

According to various embodiments, the method may further include controlling the electronic device to remain in a standby state at the first time, wherein the electronic device is capable of receiving at least one piece of data from the external device in the standby state.

According to various embodiments, a server for supporting a speech recognition service may include a communication interface that supports communication with at least one external device, a memory that stores at least one piece of data associated with an operation of the speech recognition service, a speech input processing module that processes a speech input received from a first external device, and a processor electrically connected to the communication interface, the memory, and the speech input processing module. The memory may store at least one instruction that, when executed, causes the processor to receive first data associated with the speech input from the first external device, based on the communication interface, to process the first data, based on at least one of communication with the speech input processing module and communication with at least one second external device, to transmit second data corresponding to processing of a part of the first data to the first external device at a first time that the processing of the part of the first data is completed, and to receive third data corresponding to processing of the rest of the first data from the at least one second external device and transmit the third data to the first external device at a second time after the transmission of the second data.

According to various embodiments, the speech input processing module may include at least one of an automatic speech recognition module, a natural language understanding module, and a text-to-speech module.

According to various embodiments, the processor may derive an intent of user utterance associated with the speech input from the first data as partial processing of the first data, based on the automatic speech recognition module and may generate the second data by converting at least a part of the first data associated with the derivation of the intent of the user utterance, based on the text-to-speech module.

According to various embodiments, the processor may map and store the first data and the intent of the user utterance in the memory.

According to various embodiments, the processor may identify at least one third external device associated with the intent of the user utterance, among the at least one second external device, as processing of the rest of the first data and may request the third data corresponding to the intent of the user utterance from the third external device.

Figure 7:
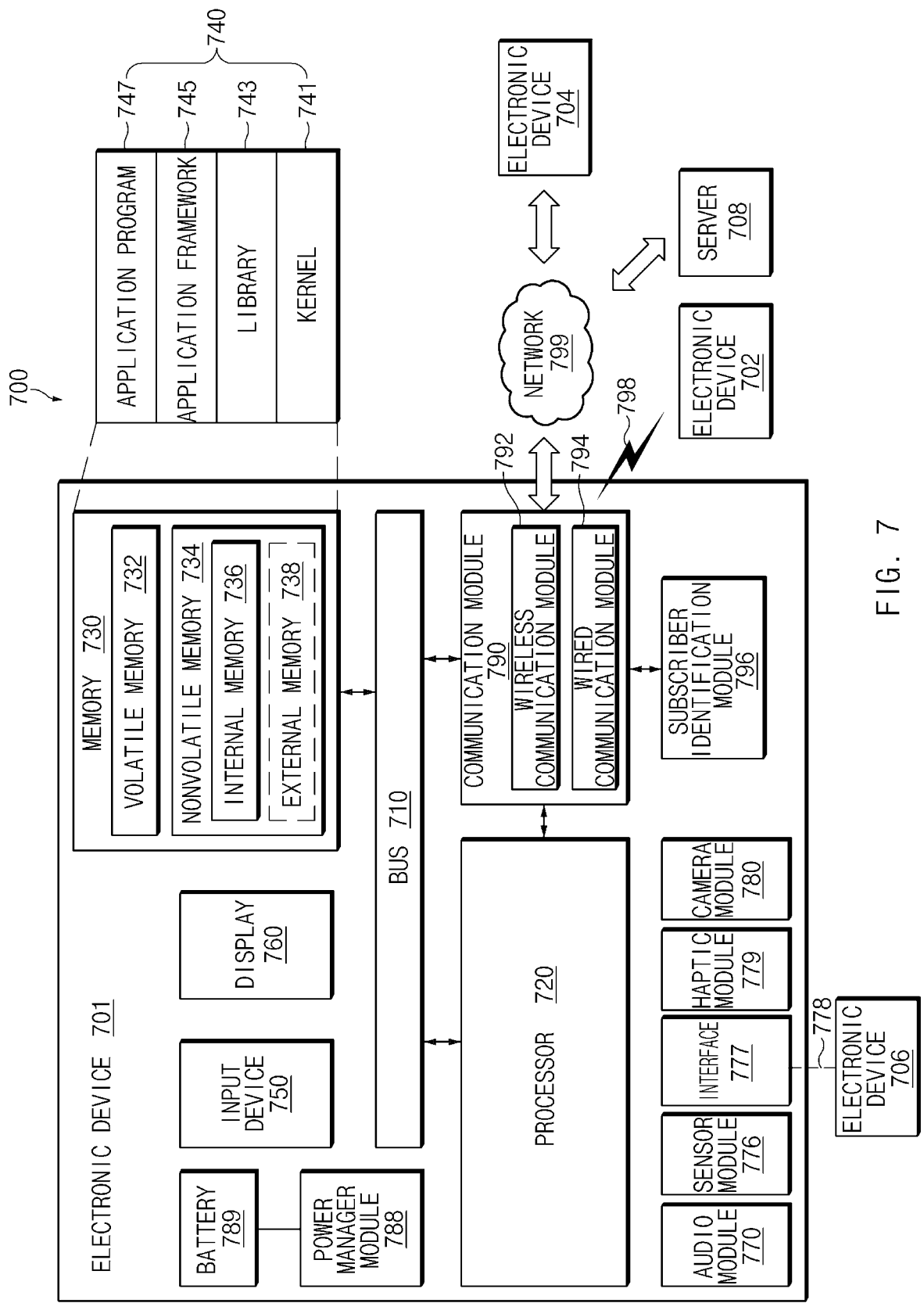
FIG. 7 illustrates an electronic device in a network environment according to various embodiments.

FIG. 7 illustrates an electronic device in a network environment, according to certain embodiments.

Referring to FIG. 7, under the network environment 700, the electronic device 701 (e.g., the electronic device 100 of FIG. 2) may communicate with an electronic device 702 through local wireless communication 798 or may communicate with an electronic device 704 or a server 708 through a network 799. According to some embodiments, the electronic device 701 may communicate with the electronic device 704 through the server 708.

According to various embodiments, the electronic device 701 may include a bus 710, a processor 720 (e.g., the processor 160 of FIG. 2), a memory 730, an input device 750 (e.g., a micro-phone or a mouse), a display device 760, an audio module 770, a sensor module 776, an interface 777, a haptic module 779, a camera module 780, a power management module 788, a battery 789, a communication module 790, and a subscriber identification module 796. According to certain embodiments, the electronic device 701 may not include at least one (e.g., the display device 760 or the camera module 780) of the above-described elements or may further include other element(s).

The bus 710 may interconnect the above-described elements 720 to 790 and may include a circuit for conveying signals (e.g., a control message or data) between the above-described elements. The processor 720 may include one or more of a central processing unit (CPU), an application processor (AP), a graphic processing unit (GPU), an image signal processor (ISP) of a camera or a communication processor (CP). According to some embodiments, the processor 720 may be implemented with a system on chip (SoC) or a system in package (SiP). For example, the processor 720 may drive an operating system (OS) or an application program to control at least one of another element (e.g., hardware or software element) of the electronic device 701 connected to the processor 720 and may process and compute various data. The processor 720 may load a command or data, that is received from at least one of other elements (e.g., the communication module 790), into a volatile memory 732 to process the command or data and may store the result data into a nonvolatile memory 734.

The memory 730 may include, for example, the volatile memory 732 or the nonvolatile memory 734. The volatile memory 732 may include, for example, a random access memory (RAM) (e.g., a dynamic RAM (DRAM), a static RAM (SRAM), or a synchronous DRAM (SDRAM)). The nonvolatile memory 734 may include, for example, an one time programmable read-only memory (ROM) (OTPROM), a programmable read-only memory (PROM),an erasable PROM (EPROM), an electrically EPROM (EEPROM), a mask ROM, a flash ROM, a flash memory, a hard disk drive (HDD), or a solid-state drive (SSD). In addition, the nonvolatile memory 734 may be configured in the form of an internal memory 736 or the form of an external memory 738 that is available through connection only if necessary, according to the connection with the electronic device 701. The external memory 738 may further include a flash drive such as compact flash (CF), secure digital (SD), micro secure digital (Micro-SD), mini secure digital (Mini-SD), extreme digital (xD), a multimedia card (MMC), or a memory stick. The external memory 738 may be operatively or physically connected with the electronic device 701 in a wired manner (e.g., a cable or a universal serial bus (USB)) or a wireless (e.g., Bluetooth) manner.

For example, the memory 730 may store, for example, at least one different software element, such as a command or data associated with the program 740, of the electronic device 701. The program 740 may include, for example, a kernel 741, a library 743, an application framework 745 or an application program (interchangeably, "application") 747.

The input device 750 may include a microphone, a mouse, or a keyboard. According to various embodiments, the keyboard may include a keyboard physically connected or a virtual keyboard displayed through the display device 760.

The display device 760 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to certain embodiments, the display may be flexibly, transparently, or wearably implemented. The display may include a touch circuitry, that is able to detect a user's input such as a gesture input, a proximity input, or a hovering input or a pressure sensor (interchangeably, a force sensor) that is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 701.

The audio module 770 may convert, for example, from a sound into an electrical signal or from an electrical signal into the sound. According to some embodiments, the audio module 770 may acquire sound through the input device 750 (e.g., a microphone) or may output sound through an output device (not illustrated) (e.g., a speaker or a receiver) included in the electronic device 701, an external electronic device (e.g., the electronic device 702 (e.g., a wireless speaker or a wireless headphone)) or an electronic device 706 (e.g., a wired speaker or a wired headphone) connected with the electronic device 701.

The sensor module 776 may measure or detect, for example, an internal operating state (e.g., power or temperature) of the electronic device 701 or an external environment state (e.g., an altitude, a humidity, or brightness) to generate an electrical signal or a data value corresponding to the information of the measured state or the detected state. The sensor module 776 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 776 may further include a control circuit for controlling at least one or more sensors included therein. According to various embodiments, the sensor module 776 may be controlled by using a processor (e.g., a sensor hub) separate from the processor 720. In the case that the separate processor (e.g., a sensor hub) is used, while the processor 720 is in a sleep state, the separate processor may operate without awakening the processor 720 to control at least a portion of the operation or the state of the sensor module 776.

According to certain embodiments, the interface 777 may include a high definition multimedia interface (HDMI), a universal serial bus (USB), an optical interface, a recommended standard 232 (RS-232), a D-subminiature (D-sub), a mobile high-definition link (MHL) interface, a SD card/MMC(multi-media card) interface, or an audio interface. A connector 778 may physically connect the electronic device 701 and the electronic device 706. According to some embodiments, the connector 778 may include, for example, an USB connector, an SD card/MMC connector, or an audio connector (e.g., a headphone connector).

The haptic module 779 may convert an electrical signal into mechanical stimulation (e.g., vibration or motion) or into electrical stimulation. For example, the haptic module 779 may apply tactile or kinesthetic stimulation to a user. The haptic module 779 may include, for example, a motor, a piezoelectric element, or an electric stimulator.

The camera module 780 may capture, for example, a still image and a moving picture. According to various embodiments, the camera module 780 may include at least one lens (e.g., a wide-angle lens and a telephoto lens, or a front lens and a rear lens), an image sensor, an image signal processor, or a flash (e.g., a light emitting diode or a xenon lamp).

The power management module 788, that is to manage the power of the electronic device 701, may constitute at least a portion of a power management integrated circuit (PMIC).

The battery 789 may include a primary cell, a secondary cell, or a fuel cell and may be recharged by an external power source to supply power at least one element of the electronic device 701.

The communication module 790 may establish a communication channel between the electronic device 701 and an external device (e.g., the first external electronic device 702, the second external electronic device 704, or the server 708). The communication module 790 may support wired communication or wireless communication through the established communication channel. According to certain embodiments, the communication module 790 may include a wireless communication module 792 or a wired communication module 794. The communication module 790 may communicate with the external device (e.g., the first external electronic device 702, the second external electronic device 704, or the server 708) through a first network 798 (e.g. a wireless local area network such as Bluetooth or infrared data association (IrDA)) or a second network 799 (e.g., a wireless wide area network such as a cellular network) through a relevant module among the wireless communication module 792 or the wired communication module 794.

The wireless communication module 792 may support, for example, cellular communication, local wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The local wireless communication may include wireless fidelity (WiFi), WiFi Direct, light fidelity (LiFi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the present disclosure, "GPS" and "GNSS" may be interchangeably used.

According to some embodiments, when the wireless communication module 792 supports cellar communication, the wireless communication module 792 may, for example, identify or authenticate the electronic device 701 within a communication network using the subscriber identification module (e.g., a SIM card) 796. According to various embodiments, the wireless communication module 792 may include a communication processor (CP) separate from the processor 720 (e.g., an application processor (AP)). In this case, the communication processor may perform at least a portion of functions associated with at least one of elements 710 to 796 of the electronic device 701 in substitute for the processor 720 when the processor 720 is in an inactive (sleep) state, and together with the processor 720 when the processor 720 is in an active state. According to certain embodiments, the wireless communication module 792 may include a plurality of communication modules, each supporting only a relevant communication scheme among cellular communication, local wireless communication, or a GNSS communication.

The wired communication module 794 may include, for example, a local area network (LAN) service, a power line communication, or a plain old telephone service (POTS).

For example, the first network 798 may employ, for example, WiFi direct or Bluetooth for transmitting or receiving commands or data through wireless direct connection between the electronic device 701 and the first external electronic device 702. The second network 799 may include a telecommunication network (e.g., a computer network (e.g., a LAN or a WAN), the Internet or a telephone network) for transmitting or receiving commands or data between the electronic device 701 and the second electronic device 704.

According to various embodiments, the commands or the data may be transmitted or received between the electronic device 701 and the second external electronic device 704 through the server 708 connected with the second network 799. Each of the first and second external electronic devices 702 and 704 may be a device of which the type is different from or the same as that of the electronic device 701. According to various embodiments, all or a part of operations that the electronic device 701 will perform may be executed by another or a plurality of electronic devices (e.g., the electronic devices 702 and 704 or the server 708). According to some embodiments, in the case that the electronic device 701 executes any function or service automatically or in response to a request, the electronic device 701 may not perform the function or the service internally, but may alternatively or additionally transmit requests for at least a part of a function associated with the electronic device 701 to any other device (e.g., the electronic device 702 or 704 or the server 708). The other electronic device (e.g., the electronic device 702 or 704 or the server 708) may execute the requested function or additional function and may transmit the execution result to the electronic device 701. The electronic device 701 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) that performs corresponding operations by executing one or more software programs that are stored in a memory device (e.g., the memory 730).

The term "module" used herein may include a unit, that is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, that are known or will be developed.

At least a part of an apparatus (e.g., modules or functions thereof) or a method (e.g., operations) according to various embodiments may be, for example, implemented by instructions stored in a computer-readable storage media (e.g., the memory 730) in the form of a program module. The instruction, when executed by a processor (e.g., the processor 720), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

In certain embodiments, an electronic device may include a processor and a memory for storing computer-readable instructions. The memory may include instructions for performing the above-mentioned various methods or functions when executed by the processor. For example, the memory may include instructions that, when executed by the processor, cause the processor to execute obtain, using the microphone, a speech input corresponding to a user utterance, transmit, using the communication circuit, first data associated with the speech input to a first server configured to support the speech recognition service, output second data received from the first server after a first period of time has elapsed since the transmission of the first data, the second data being a part of a response of the user utterance, and output third data received from the first server or a second server configured to support the speech recognition service after a second period of time has elapsed from the first period of time, the third data being other part of the response of the user utterance.

Each element (e.g., a module or a program module) according to various embodiments may be composed of single entity or a plurality of entities, a part of the above-described sub-elements may be omitted, or other sub-elements may be further included. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device for supporting a speech recognition service, the electronic device comprising:
   a communication circuit configured to communicate with at least one external device;
   a microphone configured to receive a speech input corresponding to a user utterance;
   a memory configured to store at least one piece of data associated with an operation of the speech recognition service;
   at least one speaker configured to output speech data; and
   a processor electrically connected to the communication circuit, the microphone, the memory, and the at least one speaker,
   wherein the processor is configured to:
      receive the speech input and transmit first data associated with the speech input to a first server configured to support the speech recognition service;
      output a first response of a specified sound or control a motion of at least a part of the electronic device, based on completion of conversion of the first data from the speech input to text by the first server, at a first time;
      output a second response at a second time after a first predetermined period of time has elapsed since the transmission of the first data, in response to receiving second data including at least one grammatical unit of the text from the first server;
output a third response at a third time after a second predetermined period of time has elapsed from the second time, in response to receiving third data corresponding to an intent of the user utterance from a second server configured to support the speech recognition service before the third time; and
output a fourth response stored in the memory at the third time, in response to not receiving the third data from the second server before the third time,
wherein the second data is a part of a response to the user utterance, and wherein the third data is a remaining part of the response to the user utterance.

2. The electronic device of claim 1, wherein the processor is configured to construct at least one piece of specified response data in the memory as a database in relation to processing of the speech input.

3. The electronic device of claim 1, further comprising:
a display,
wherein the processor is configured to:
control the display to output first contents in a first form when outputting the third [[data]] response at the third time; and
control the display to output second contents in a second form that is at least partly different from the first form when outputting the fourth response at the third time.

4. The electronic device of claim 1, wherein the processor is configured to control the electronic device to remain in a standby state at the second time, the electronic device being capable of receiving at least one piece of data from the external device in the standby state.

5. The electronic device of claim 1, wherein the third data comprises personified contents.

6. A method for operating a speech recognition service by an electronic device, the method comprising:
receiving a speech input corresponding to a user utterance and transmitting first data associated with the speech input to first server configured to support the speech recognition service;
outputting a first response of a specified sound or control a motion of at least a part of the electronic device, based on completion of conversion of the first data from the speech input to text by the first server, at a first time;
outputting a second response at a second time that a first predetermined period of time has elapsed after the transmission of the first data, in response to receiving second data including at least one grammatical unit of the text from the first server; and
outputting a third response at a third time that a second predetermined period of time has elapsed from the second time, in response to receiving third data corresponding to an intent of the user utterance from a second server configured to support the speech recognition service before the third time; and
output a fourth response stored in a memory of the electronic device at the third time, in response to not receiving the third data from the second server before the third time,
wherein the second data is a part of a response to the user utterance, and wherein the third data is a remaining part of the response to the user utterance.

7. The method of claim 6, further comprising:
constructing at least one piece of response data associated with processing of the speech input as a database.

8. The method of claim 6, further comprising:
outputting first contents in a first form when outputting the third response at the third time; and
outputting second contents in a second form that is at least partly different from the first form when outputting the fourth response at the third time.

9. The method of claim 6, further comprising:
controlling the electronic device to remain in a standby state at the second time, wherein the electronic device is capable of receiving at least one piece of data from an external device in the standby state.

10. The method of claim 6, wherein the third data comprises personified contents.

11. A server for supporting a speech recognition service, the server comprising:
a communication interface configured to support communication with at least one external device;
a memory configured to store at least one piece of data associated with an operation of the speech recognition service;
a speech input processing module configured to process a speech input corresponding to a user utterance, the speech input received from a first external device; and
a processor electrically connected to the communication interface, the memory, and the speech input processing module,
wherein the memory stores at least one instruction that, when executed, causes the processor to:
receive first data associated with the speech input from the first external device, based on the communication interface;
process the first data, based on at least one of communication with the speech input processing module and communication with at least one second external device;
transmit a signal corresponding to completion of conversion of the first data from the speech input to text to the first external device;
transmit second data including at least one grammatical unit of the text to the first external device at a predetermined second time after the processing of a part of the first data is completed; and
receive third data corresponding to an intent of the user utterance from the at least one second external device and transmit the third data to the first external device at a predetermined third time after the transmission of the second data.

12. The server of claim 11, wherein the speech input processing module includes at least one of an automatic speech recognition module, a natural language understanding module, and a text-to-speech module.

13. The server of claim 12, wherein the processor is configured to derive the intent of the user utterance associated with the speech input from the first data as partial processing of the first data, based on the automatic speech recognition module and to generate the second data by converting at least a part of the first data associated with the derivation of the intent of the user utterance, based on the text-to-speech module.

14. The server of claim 13, wherein the processor is configured to map and store the first data and the intent of the user utterance in the memory.

15. The server of claim 13, wherein the processor is configured to:
identify at least one third external device associated with the intent of the user utterance, among the at least one second external device; and request the third data corresponding to the intent of the user utterance from the third external device.

16. The server of claim 11, wherein the third data comprises personified contents.

* * * * *